Figure 1:
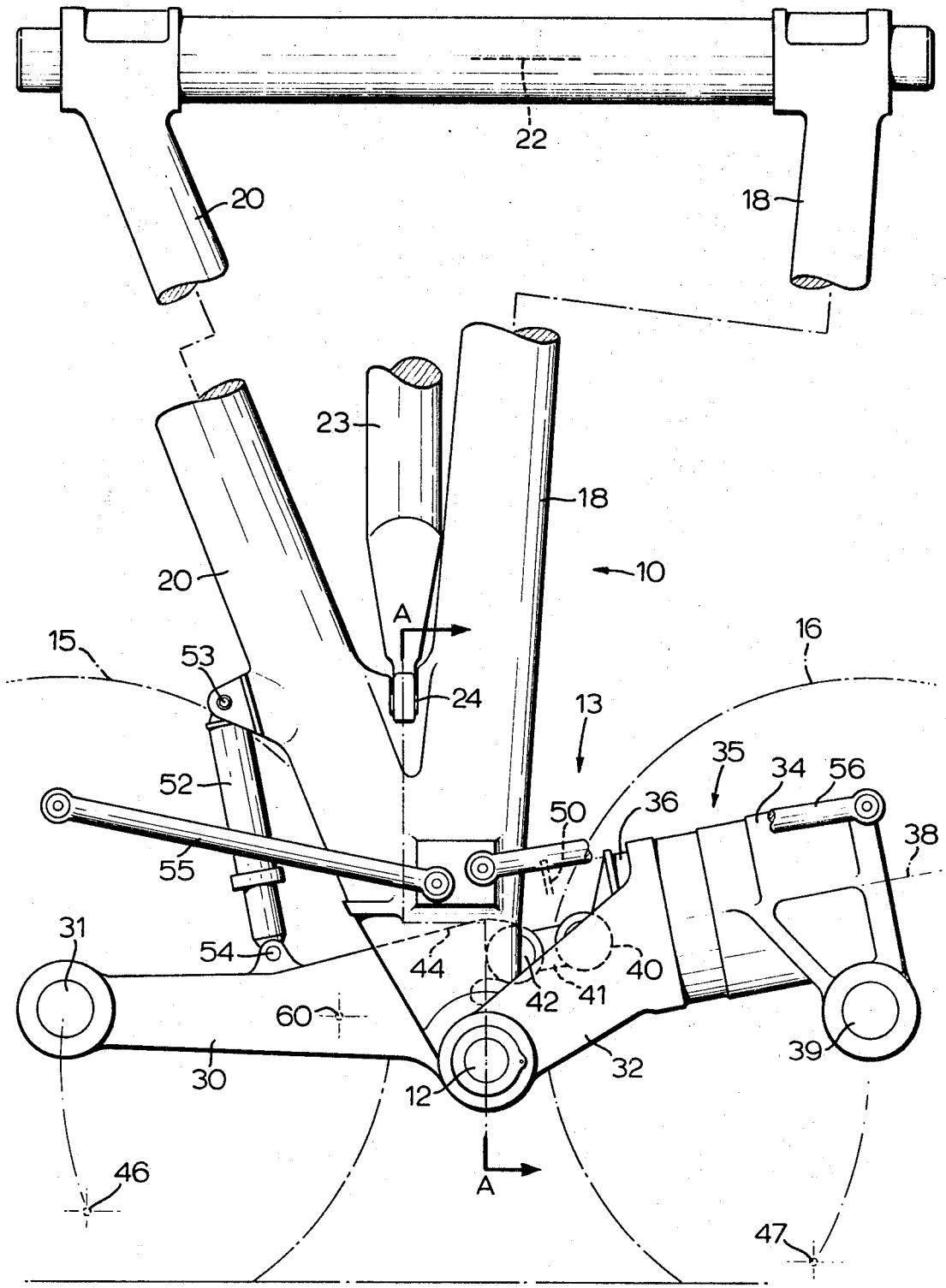

United States Patent

[11] 3,544,043

| [72] | Inventor | Henry Ralph Stratford |
| | | Whitby, Ontario, Canada |
| [21] | Appl. No. | 750,195 |
| [22] | Filed | Aug. 5, 1968 |
| [45] | Patented | Dec. 1, 1970 |
| [73] | Assignee | York Gears Limited |
| | | Toronto, Ontario, Canada |
| [32] | Priority | July 22, 1967 |
| [33] | | Great Britain |
| [31] | | No. 38698/67 |

[54] AIRCRAFT LANDING GEAR
6 Claims, 2 Drawing Figs.

[52] U.S. Cl. .................................................. 244/104, 244/102
[51] Int. Cl. .................................................. B64c 25/58
[50] Field of Search........................................ 244/100, 102, 103, 104, 50

[56] References Cited
UNITED STATES PATENTS

| 2,130,914 | 9/1938 | Warren ..................... | 244/104 |
| 2,578,200 | 12/1951 | Nicholl ...................... | 244/104 |
| 2,842,326 | 7/1958 | Sharples .................... | 244/103 |
| 2,960,289 | 11/1960 | Westcott, Jr. .............. | 244/104 |
| 2,997,261 | 8/1961 | Westcott, Jr. .............. | 244/103 |

FOREIGN PATENTS

| 1,391,911 | 2/1965 | France ....................... | 244/102 |

Primary Examiner—Milton Buchler
Assistant Examiner—Paul E. Sauberer
Attorney—Thomas T. Rieder ABSTRACT: An aircraft undercarriage which includes an upper support structure extending down from the wing or fuselage, and two independent bogie arms extending forwardly and rearwardly, respectively, from the bottom of the support structure. Each bogie arm has a wheel axle on which can be mounted one or a pair of wheels. The bogie arms are pivoted together and to the support structure. A shock-absorbing cylinder is incorporated between the two bogie arms so as to resist upward movement of the wheel axles with respect to the support structure.

INVENTOR.
HENRY RALPH STRATFORD

INVENTOR.
HENRY RALPH STRATFORD
BY
Agent

AIRCRAFT LANDING GEAR

This invention relates to landing gear for aircraft, and has particular reference to landing gears adapted to support considerable loads and which, for this purpose, comprise two-wheel axles one behind the other, these axles being supported in a bogie structure at the bottom of a substantially vertical upper support structure which transmits the weight of the fuselage to the bogie.

One of the primary considerations in the design of landing gear for large, heavy aircraft is the ability of the landing gear ro absorb the shock of landing. One conventional means of accomplishing this shock absorption is to incorporate a shock absorber at the lower end of the upper support structure in such a way that the bogie pin is movable vertically with respect to the upper end of the support structure which is fixed to the aircraft. This conventional construction has a number of disadvantages, among which are:
  a. the difficulty of gaining access to the shock absorber seals;
  b. the additional weight of structure required to resist torque as between the piston and the cylinder of the shock absorber; and
  c. the problem of the shock absorber piston binding against the shock absorber cylinder due to bending loads placed on the upper support structure during landing.

Accordingly, this invention provides an aircraft undercarriage, comprising: an upper support structure fixed at the top to the aircraft fuselage and having a pivot pin at its lower end, a first bogie arm pivoted to said pivot pin and supporting a first wheel axle remote from said pivot pin, a second bogie arm pivoted to said first bogie arm and supporting a second wheel axle remote from the pivot axis between said bogie arms, a shock absorber incorporated into one of said bogie arms, the cylinder of said shock absorber being fixed with respect to said one of said bogie arms such that the axis of the cylinder is spaced from said pivot axis between said bogie arms, and a connecting arm having one end pivotally connected to the piston of said shock absorber and the other end pivotally connected to the other of said bogie arms about an axis remote from said pivot axis between said bogie arms.

Figure 2:
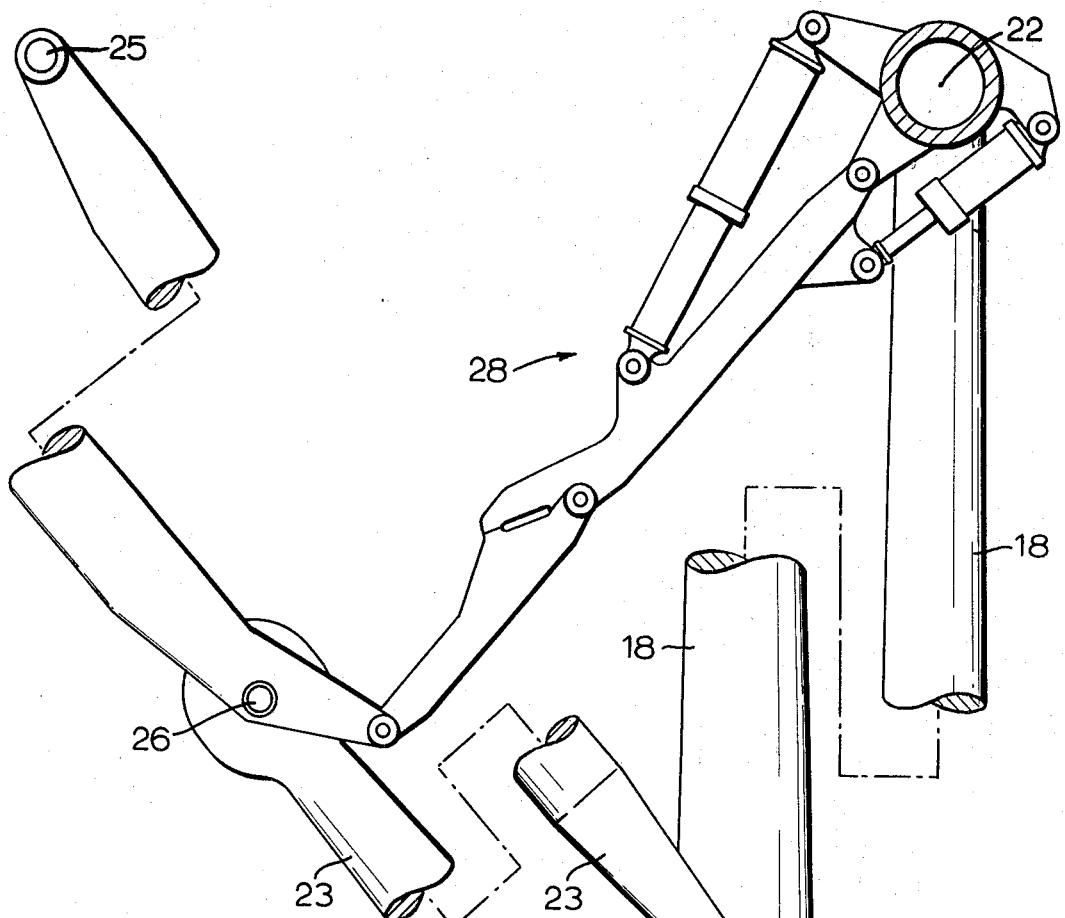

One embodiment of this invention is shown in the accompanying drawings, in which like numerals refer to like parts in the two FIGS. and in which:

FIG. 1 is an elevational view of an aircraft-landing gear, taken parallel with the wheel axes; and FIG. 2 is a view of the landing gear of FIG. 1, taken at right angles to the wheel axes, and incorporating section A-A as marked in FIG. 1.

Turning first to FIG. 1, the aircraft-landing gear shown consists essentially of (a) an upper support structure 10, which is adapted to be attached at its upper end to the aircraft fuselage (not shown) and which supports at its lower end a bogie pivot pin 12, and (b) a bogie structure 13 which is attached to the upper support structure at the bogie pivot pin 12, and which supports the two pairs of wheels 15 and 16.

The upper support structure 10 comprises a substantially vertical member 18 which is integral with an angle support member 20, both of the members 18 and 20 being pivoted at their upper ends about a pivot axis 22, such that the entire landing gear can be rotated about the pivot axis 22 and stowed within the wing and/or fuselage of the aircraft. A side brace 23 is pivoted to the vertical support member 18 at a pivot 24 and, as best seen in fIG. 2, the side brace 23 is a two-part geniculated member joined to the fuselage at 25 and adapted to fold upwardly about the intermediate pivot point 26 when the landing gear is stowed in the aircraft. The mechanism which begins the folding of the side brace 23 is shown generally at 28, all of the structural members of which are conventional and need not be described in detail.

This invention is particularly concerned with the bogie structure 13, and this will now be described with particular reference to FIG. 1. Pivoted about the bogie pivot pin 12 is a first bogie arm 30 which carries at its leftward end the axle (or axles) 31 on which the pair 15 of wheels is mounted. The aircraft-landing gear shown in FIG. 1 is adapted to be fixed to the aircraft with the pair 15 of wheels forward of the pair 16. A second bogie arm 32 is also pivoted to the bogie pivot pin 12, and this latter arm 32 incorporates integrally within its structure the cylinder 34 of a shock absorber 35, of which the piston 36 is adapted to reciprocate along an axis 38 which is spaced from the pivot point between the the first arm 30 and the second arm 32, i.e. the axis of the bogie pivot pin 12. The second bogie arm carries at its rightward end the axle (or axles) 39 on which the pair 16 of wheels is mounted.

The piston 36 is pivoted at 40 to one end of a connecting arm 41, the other end of which is pivoted at 42 to a projection 44 which is integral with the first bogie arm 30 and which is spaced from the pivot axis between the first and second bogie arms 30 and 32, i.e. the bogie pivot pin 12.

The shock absorber 35 can be any of several types, such as oleopneumatic, liquid compression, solid elastomer, etc. and it is preferred that it have a spring component (displacement sensitive resistance) which at all times urges the piston 36 outwardly to the left of the cylinder 34. The shock absorber 35 is thus one which is adapted to be closed under load, and the fact that it is biased to an open position urges the first bogie arm 30 to pivot in the counterclockwise direction about the bogie pivot pin 12, and urges the second bogie arm 32 to pivot in the clockwise direction about the bogie pivot pin 12, thereby urging the pairs of wheels 15 and 16 to move downwardly with respect to the upper support structure. In FIG. 1, the diagrammatic points 46 and 47 represent the positions of the axes 31 and 39 of the pairs 15 and 16 of wheels, when the aircraft is about to land or has just taken off, with no vertical load on the landing gear. The dotted line position 50 of the piston 36 in FIG. 1 shows approximately the position of the piston 36 with respect to the second bogie arm 32 when the wheel axles 31 and 39 are at their lowest positions 46 and 47, respectively.

It may be desirable, particularly with heavy, large aircraft, to construct the landing gear such that one pair of wheels touches down before the other pair of wheels, in order to minimize instantaneous loads during the landing shock. In the landing gear shown in FIG. 1, it has been assumed that the leading pair of wheels 15 touches down after the trailing pair 16, and in order to hold the leading pair 15 in a position above the trailing pair 16 (it will be noted that the elevation of pint 46 is greater than that of point 47), a compressive springbox 52 has been provided with its upper end pivotally connected at 53 to the angle support member 20, and with its lower end pivotally connected at 54 to the first bogie arm 30. The compressive springbox 52 tends always to shove the wheel axle 31 out to its furthest downward position 46, and the maximum elongation of the compressive springbox is what determines the position 46. By selecting the maximum elongation of the compressive springbox 52 and of the shock absorber 35, it is possible to make certain that the axle 39 is lower than the axle 31 when the aircraft is about to land. A further advantage of providing the compressive springbox 52 relates to the stowing away of the landing gear after the aircraft has taken off. The compressive springbox 52 prevents the pair 15 of wheels from flopping about, and permits the designer to prepare a stowage space in the aircraft with an exact knowledge of where the pairs 15 and 16 of wheels will be. Furthermore, when brakes are applied after the aircraft has taken off to stop all the wheels from rotating prior to stowage, the axle 31 is inertially forced downwardly and the axle 39 upwardly due to the braking moment. If the axle 31 is already in its lowest position as determined by the maximum elongation of the compressive springbox 52, there will be no sudden impact as the axle 31 reaches the position 46.

It will be appreciated that, in instances where the only important feature of this compressive springbox 52 is to ensure that the trailing pair 16 of wheels touches down before the leading pair 15, the compressive springbox 52 could be replaced by any flexible but nonextensible element, such as a chain. Again, there will be many instances where no element such as the compressive springbox 52 will be required, particularly where landing loads are so small that it does not matter whether the pairs 15 and 16 of wheels touch down simultaneously or sequentially.

The conventional brake compensating links 55 and 56 are also provided, each having one end anchored to the upper support structure and the other end anchored to a conventional brake base plate (not shown) which floats on the respective axle 31, 39. One advantage of the present invention over the conventional structure in which the shock-absorbing component is incorporated into the lower end of the upper support structure, is that there is no serious limitation to the position on the upper support structure at which the inner ends of the brake-compensating links 55 and 56 can be attached.

Other advantages of the present invention over the conventional structure in which the shock-absorbing element is incorporated into the lower end of the upper support structure are as follows:

1. There is no necessity to provide a torque linkage to ensure that the wheels track properly while the plane is taxiing around a curve, and at all other times.
2. The upper support structure can be optimized, particularly with regard to the point of connection between the angle support member 20 and the vertical support member 18. The lower this connection, the better. The increased structural rigidity which results will reduce dynamic magnification of spin-up and spring-back loads.
3. The shock absorber 35 is more accessible for servicing.

It will be appreciated that, while only one shock absorber has been shown and described herein, it would be possible to provide two shock absorbers, one in each bogie support arm 30 and 32. Furthermore, the whole bogie structure could be "turned upside down" so to speak, such that the line along which the load on the connecting arm 41 is transmitted lies beneath the bogie pivot pin 12 rather than above it. In this latter case, the shock absorber piston 36 will have to be in tension, i.e. be such as to be extracted under load, rather than compression (inserted under load).

It is also pointed out that the pivot axis between the first and second bogie arms 30 and 32 need not be identical with the pivot axis between the upper support structure 10 and the bogie assembly 13 generally. For example, referring to FIG. 1, it would be possible to construct the landing gear such that the upper support structure 10 were pivoted at the location 60 on the first bogie arm 30, while the two bogie arms 30 and 32 remained pivoted about the bogie pivot pin 12. In the latter situation, it does not matter whether the axis 38 passes through the point 60 or not, provided the axis 38 is clear of the bogie pivot pin 12, i.e. is clear of the pivot connection between the two bogie arms 30 and 32.

While preferred embodiments of this invention have been disclosed herein, those skilled in the art will appreciate that changes and modifications may be made therein without departing from the spirit and scope of this invention as defined in the appended claims.

I claim:

1. An aircraft undercarriage, comprising:
    an upper support structure fixed at the top to the air craft fuselage and having a pivot pin at its lower end;
    a first bogie arm pivoted to said pivot pin and supporting a first wheel axle remote from said pivot pin;
    a second bogie arm pivoted to said first bogie arm and supporting a second wheel axle remote from the pivot axis between said bogie arms; and
    a shock absorber incorporated into one of said bogie arms, said shock absorber including a cylinder and a piston slidable within said cylinder, the cylinder of said shock absorber being fixed with respect to said one of said bogie arms such that the axis of the cylinder is spaced from said pivot axis between said bogie arms, and a connecting arm having one end pivotally connected to said piston of said shock absorber and the other end pivotally connected to the other of said bogie arms about an axis remote from said pivot axis between said bogie arms, said shock absorber being such as to load the movement of the piston which takes place when the wheel axles move upwardly with respect to the upper support structure.

2. An aircraft undercarriage as claimed in claim 1, in which the axis of said pivot pin coincides with the said pivot axis between said bogie arms.

3. An aircraft undercarriage, as claimed in claim 2, in which the cylinder of the shock absorber is integral with said one of said bogie arms.

4. An aircraft undercarriage as claimed in claim 3, in which the axis of the cylinder is above the pivot axis between the bogie arms, the shock absorber being adapted to close under load.

5. An aircraft undercarriage as claimed in claim 1, in which the cylinder of the shock absorber is integral with said one of said bogie arms.

6. An aircraft undercarriage as claimed in claim 1, in which the axis of the cylinder is above the pivot axis between the bogie arms, the shock absorber being adapted to close under load.